Dec. 4, 1956   C. H. JONES ET AL   2,772,664
FLUID FLOW METER

Filed Dec. 11, 1953   2 Sheets-Sheet 1

Clifton H. Jones
Charles W. Foust       Inventors

By George J. Silhavy   Attorney

Dec. 4, 1956  C. H. JONES ET AL  2,772,664
FLUID FLOW METER

Filed Dec. 11, 1953  2 Sheets—Sheet 2

Clifton H. Jones
Charles W. Foust   Inventors

United States Patent Office 2,772,664
Patented Dec. 4, 1956

2,772,664

FLUID FLOW METER

Clifton H. Jones, Nixon, and Charles W. Foust, Elizabeth, N. J., assignors to Esso Research and Engineering Company, a corporation of Delaware Application December 11, 1953, Serial No. 397,598

1 Claim. (Cl. 121—148)

This invention relates to an improved device for measuring rate of flow of fluid in a conduit.

The invention will be fully understood from the following description taken in connection with the accompanying drawing in which.

Figure 1:
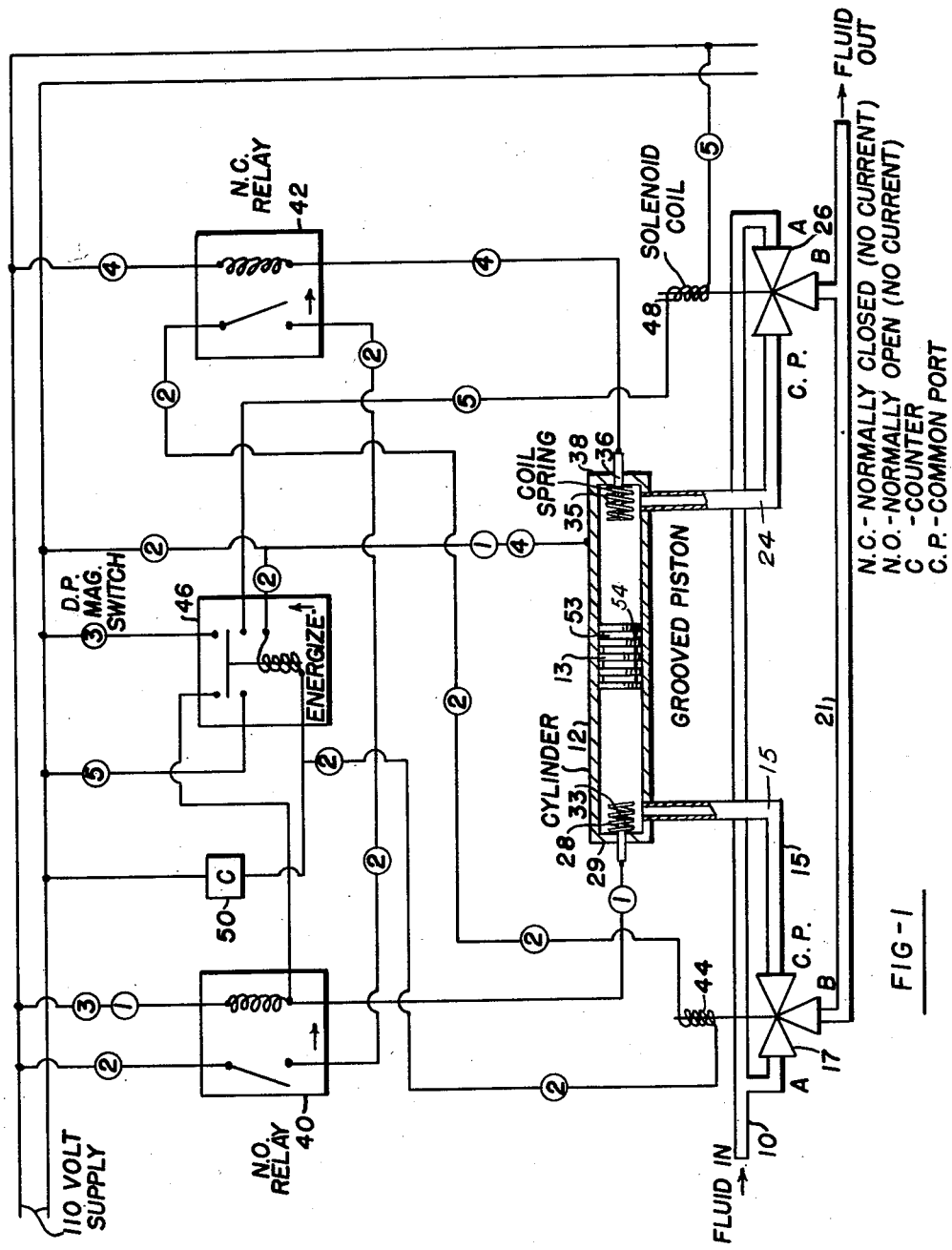
Fig. 1 is a diagrammatic view partly in section of the fluid flow meter device constructed according to this invention.
Figure 2:
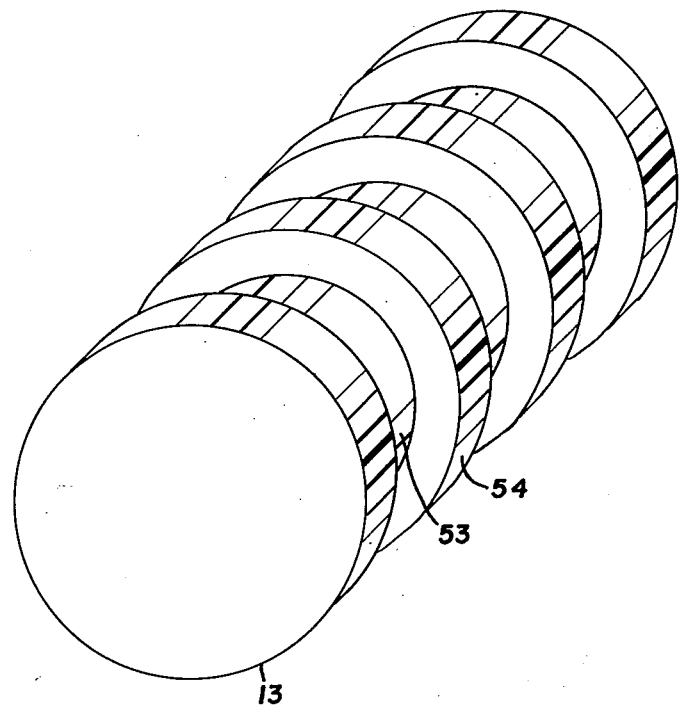
Fig. 2 is an isometric view of the piston.

Referring particularly to the drawings, reference numeral 10 designates a supply conduit containing fluid, the rate of flow of which is to be continuously measured. The fluid can be either liquid or gas, both non-conductive of electricity. Examples are hydrogen and nitrogen and hydrocarbon liquids.

The fluid is passed from the supply conduit 10 into a cylinder 12 where it actuates a free-floating piston 13 to reciprocate the piston by the pressure of the flowing fluid itself. The piston 13 is designed to give negligible pressure drop as it travels. The number of strokes of the piston and hence units of volume are counted and by measuring the time elapsed, volumetric flow rate is the result. The total number of strokes represents the total volume of fluid that has passed through the meter.

Entrance of the fluid into the left-hand end of the cylinder as viewed in Fig. 1 is effected through a first branch line 15 leading from the upstream side of the supply conduit 10 through a three-way solenoid valve 17, which is held energized and keeps parts A to CP open, into the cylinder 12 at the left-hand side of the piston 13. A discharge line 21 communicates with the first branch line 15 through the port CP of the three-way valve 17.

A second branch line 24 leads from the downstream side of the fluid supply conduit 10 through a second three-way valve 26 into the cylinder 12 at the right-hand side of the piston through the ports A and CP of the valve 26. The discharge line 21 communicates with the second branch line 24 through a port CP in the three-way valve 26.

The actuation of the three-way valves is such that the fluid enters the left-hand end of the cylinder 12 as viewed in Fig. 1 through the ports A and CP of the valve 17 which is held energized to keep these ports open. At the same time the three-way solenoid valve 26 is de-energized holding ports CP to B open. This allows the displaced fluid from the right-hand side of the cylinder 12 to pass on out of the meter as the piston 12 travels to the right as viewed in Fig. 1. Conversely, as the piston travels to the left as viewed in Fig. 1, the left-hand solenoid valve is de-energized to keep ports CP to B open and the right-hand valve 26 is energized to cause ports A to CP to open feeding the fluid into the right-hand end of the cylinder 12 to travel the piston 13 to the left-hand end of the cylinder.

The mechanism for actuating the solenoid valves automatically and for counting strokes of the piston is as follows. First take the case where the piston 13 is traveling to the left as viewed in Fig. 1 with the left-hand solenoid valve 17 de-energized and the right-hand solenoid valve 26 energized. It is desired to reverse the position of the solenoid valves 17 and 26 and count a stroke when the piston 13 reaches the left-hand end of its travel in the cylinder 12 so that it may be started off in the opposite direction. To accomplish this result, as the piston 13 approaches the end of its travel toward the left as viewed in Fig. 1, it first strikes a coal spring 28 protruding toward the piston from the end wall 29 of the cylinder along the longitudinal axis of the cylinder into position to be engaged by the piston and compressed thereby. As the piston approaches the end of its travel, it first strikes the coil spring 28 which tends to cushion the force of the piston striking the end probe 33. After compressing the spring 28 a bit, the piston 13 continues toward the left as viewed in Fig. 1 until it strikes the end probe 33 which completes an electric circuit and in turn completes a series of other circuits to be later described. A similar coil spring 35 and probe 36 are positioned protruding into the cylinder 12 from the right-hand end wall 38 of the cylinder 12.

Circuit No. 1 includes the primary side of the normally open (no current) relay. The circuit is actually completed to ground through the coil spring 28 to the housing of the cylinder 12. The completion of circuit No. 1 causes No. 2 circuit to be completed through the N. O. relay 40. The circuit No. 2 is already complete in the N. C. relay 42. As shown, the closing of circuit No. 2 energizes the left-hand solenoid 44 which causes ports A to CP of the valve 17 to open permitting the fluid to reverse the direction of the piston 13. At the same time, the closing of No. 2 circuit also energizes the double-pole magnetic switch 46, in turn completing circuit No. 3. No. 3 circuit is a holding circuit that keeps the primary side of the N. O. relay 40 energized after circuit No. 1 is broken by virtue of the piston 13 moving away from the probe 33. This is necessary to maintain the solenoid 44 energized.

At the same time that No. 3 circuit is completed, No. 5 circuit is broken, de-energizing the right-hand solenoid 48, opening ports CP to B in valve 26 and permitting the displaced fluid to leave from the right-hand end of the cylinder 12 through the discharge conduit 21. When the piston 13 reaches the right-hand probe 36, the circuit No. 4 is completed, breaking (through the N. C. relay 42) No. 2 circuit and causing the solenoids to again reverse. The counter 50 (circuit No. 6) records a stroke each time circuit No. 2 is completed.

Instantaneous rate indication can be effected by adding a timer (not shown) in conjunction with the counter 50.

By the construction described the flow of fluid through the supply conduit and out through the discharge conduit is continuously measured by the intermittent flow of the fluid from either end of the cylinder. The piston 13 moves back and forth in the cylinder 12 displacing the fluid in first one end and then the other. The rate of flow is determined from the number of displacements. Continuous flow of fluid is maintained. The mechanism constitutes a continuous volumetric displacement fluid flow metering device that is independent of gravity and viscosity effects. The free-floating piston 13 effects actuation of the various electrical circuits by closing and opening contact with the probes 33 and 36 from a position within the cylinder 12. As a result the device is free of elaborate packing glands necessary when external operating devices are used. There are no internal moving parts except for the piston 13. The piston is of substantial length such as one inch with about a one and one-half inch stroke (adjustable). The piston 13 is provided with a plurality of grooves 53 in its periphery separated by bands 54. At least four grooves as shown in the figures are contemplated and the capacity of the grooves is sufficient so that there can be only negligible (less than 1%) leakage of the fluid past the piston during the reciprocation of the piston in one direction. Circle rings could be used if desired on the piston to prevent leakage. The outer diameter of the piston is lapped to the inside surface of the cylinder in a very close fit.

By the construction described, the flow of fluid can be metered in a device which is completely independent of gravity and viscosity variations and which operates by volumetric displacement alone. The device is adaptable to either liquid or gases. It has almost unlimited range of rate of flow. It is unaffected by pressure fluctuations of the flowing stream. The fluids used should be non-conductors of electricity. The device is useful to avoid corrections for gravity and viscosity when attempting to meter a fluid stream where the viscosity and gravity are subject to considerable variation. Calibration is not required where changes in composition of the flowing fluid occur. As a result, continuous analysis of the stream is not required.

In a specific example of the structure and operation of the meter, a cylinder is used having an internal diameter of 1". The piston has an outer diameter of 1" with a lap fit in the cylinder. The piston stroke is adjustable up to 1½". The dead-end volume is about double the stroke displacement. With an operation at the 250 lbs. per sq. in. level, there is required only about 1 lb. per sq. in. to move the piston and hence no effort need be made to minimize the end volumes under these conditions. It is possible to operate at much lower pressure levels accurately by designing for a smaller end volume. On non-compressible fluid services the dead-end volume has little significance. The piston length is 1". The piston is provided with 4 grooves in its periphery separated by 5 lands. The grooves are about ⅛" wide by ⅛" deep. The clearance between the cylinder and piston is less than about 0.0005". This clearance is calculated to give less than 1% leakage when operating on hydrogen, the most difficult case. The groove volume is about 10% of the stroke volume.

The above meter when used to test the flow of nitrogen was operated from 29 strokes per minute to 240 strokes per minute with very good linearity. The deviation from straight line calibration at 240 strokes per minute was + or −2 strokes per minute. The deviation from straight line calibration at 100 strokes per minute was + or −1 stroke per minute. The capacity at 240 strokes per minute and at 250 lbs. per sq. in. was 23 S. C. F./hr. which is equivalent to a volume displacement of about 1.3 C. F. H. The flow range covered was about 12/1. There is no upper limit to the flow measureable in this manner. The flow is measureable to a lower limit of at least a ¼ to ⅜ piston and a ¼" stroke.

The nature of the present invention having been thus fully set forth and a specific example having been given, what is claimed as new and useful and desired to be secured by Letters Patent is:

We claim:

In an apparatus for measuring fluid flow through a conduit system including upstream and downstream sections of said system, a measuring cylinder closed at each end, a free piston within said cylinder adapted for reciprocal movement between the ends thereof, a pair of 3-way valves, each communicating with said cylinder at opposite ends thereof and alternately with each of said upstream and downstream conduit sections, electrical valve operating means adapted alternately to establish fluid flow into and from said cylinder from opposite ends from and to said respective upstream and downstream conduit sections, whereby said piston is moved reciprocally in said cylinder from end to end by fluid flow from said upstream section, an inter-acting series of electrical circuits to actuate said valve operating means alternately and successively, the improvement which comprises a switch mechanism at each end of said cylinder including a reciprocal switch operating probe extending axially into said cylinder for pressure engagement by said piston at the end of each full stroke thereof, and an electrical shock absorber spring disposed internally of said cylinder at each end thereof, co-axially with said probe and cylinder and extended inwardly of the cylinder beyond the inner end of said probe, each of said shock absorber springs being connected in said electrical circuits as a ground connection between one of said switches and said cylinder, and wherein said piston, at each end of its reciprocal stroke, engages one of said springs immediately prior to engagement with the probe with which said spring is associated.

References Cited in the file of this patent

UNITED STATES PATENTS

| | | |
|---|---|---|
| 949,993 | Blanchard | Feb. 22, 1910 |
| 1,808,387 | Thompson | June 2, 1931 |
| 2,344,416 | Scheibe | Mar. 14, 1944 |
| 2,555,046 | Livers et al. | May 29, 1951 |
| 2,619,076 | Agin | Nov. 25, 1952 |